US009669919B2

(12) United States Patent
Garcia Martín et al.

(10) Patent No.: US 9,669,919 B2
(45) Date of Patent: Jun. 6, 2017

(54) HIGHLY INTEGRATED INFUSED BOX MADE OF COMPOSITE MATERIAL AND METHOD OF MANUFACTURING

(71) Applicant: AIRBUS OPERATIONS S.L., Getafe (Madrid) (ES)

(72) Inventors: Diego García Martín, Getafe (ES); Lara Barroso Fernández, Getafe (ES); Pablo Cebolla Garrofe, Getafe (ES); David Alfonso Cerezo Arce, Getafe (ES); Ignacio José Márquez López, Getafe (ES)

(73) Assignee: Airbus Operations S.L., Madrid (ES)

( * ) Notice: Subject to any disclaimer, the term of this patent is extended or adjusted under 35 U.S.C. 154(b) by 152 days.

(21) Appl. No.: 14/587,647

(22) Filed: Dec. 31, 2014

(65) Prior Publication Data

US 2015/0183506 A1    Jul. 2, 2015

(30) Foreign Application Priority Data

Dec. 31, 2013   (EP) .................................. 13382581

(51) Int. Cl.
*B64C 1/00*        (2006.01)
*B64C 3/00*        (2006.01)
(Continued)

(52) U.S. Cl.
CPC .............. *B64C 3/18* (2013.01); *B29C 70/443* (2013.01); *B29D 99/0014* (2013.01); (Continued)

(58) Field of Classification Search
CPC .. B64C 1/00; B64C 3/18; B64C 3/182; B64C 3/185; B64C 3/187; B64C 3/20; B64C 3/26; B32B 37/02; B32B 3/06; B32B 37/1018; B64F 5/0009; B29C 70/443; B29D 99/0014

See application file for complete search history.

(56) References Cited

U.S. PATENT DOCUMENTS 5,560,102 A  *  10/1996  Micale .................... B23P 21/00
                                                           29/407.1
6,314,630 B1 *  11/2001  Munk ..................... B23P 21/00
                                                           29/407.01

(Continued)

FOREIGN PATENT DOCUMENTS

EP          2 604 405          6/2013

OTHER PUBLICATIONS

EP Search Report for EP 13 38 2581.0, dated May 28, 2014, 5 pages.

*Primary Examiner* — Philip J Bonzell
(74) *Attorney, Agent, or Firm* — Nixon & Vanderhye P.C.

(57) ABSTRACT

Highly integrated infused box made of composite material with two skins (3), several ribs (4), several stringers (5), a front spar and a rear spar, comprising a first semibox (1) and a second semibox (2) joined by connecting means, in which the first semibox (1) comprises one skin (3) and the ribs (4), and the second semibox (2) comprises one skin (3), the front spar, the rear spar and the stringers (5). A manufacturing method is also provided, which comprises forming processes for the first semibox (1), the second semibox (2) and an assembly process of the first semibox (1) with the second semibox (2).

19 Claims, 5 Drawing Sheets

(51) Int. Cl.
| | |
|---|---|
| *B64C 5/00* | (2006.01) |
| *B64C 3/18* | (2006.01) |
| *B64C 3/20* | (2006.01) |
| *B64C 3/26* | (2006.01) |
| *B32B 37/02* | (2006.01) |
| *B32B 37/06* | (2006.01) |
| *B32B 37/10* | (2006.01) |
| *B32B 37/16* | (2006.01) |
| *B32B 41/00* | (2006.01) |
| *B64C 5/02* | (2006.01) |
| *B64D 27/26* | (2006.01) |
| *B29C 70/44* | (2006.01) |
| *B29D 99/00* | (2010.01) |
| *B64F 5/10* | (2017.01) |
| *B32B 38/00* | (2006.01) |

(52) U.S. Cl.
CPC ........... *B32B 37/02* (2013.01); *B32B 37/06* (2013.01); *B32B 37/1018* (2013.01); *B32B 37/16* (2013.01); *B32B 41/00* (2013.01); *B64C 3/20* (2013.01); *B64C 3/26* (2013.01); *B64C 5/02* (2013.01); *B64D 27/26* (2013.01); *B64F 5/10* (2017.01); *B32B 2038/0076* (2013.01); *B32B 2038/0096* (2013.01); *B32B 2309/68* (2013.01); *B32B 2309/70* (2013.01); *B32B 2605/18* (2013.01); *B64D 2027/264* (2013.01); *Y02T 50/433* (2013.01)

(56) References Cited

U.S. PATENT DOCUMENTS

| | | | |
|---|---|---|---|
| 6,776,371 B2* | 8/2004 | Tanaka | B64C 3/20 156/182 |
| 7,182,293 B2* | 2/2007 | Sarh | B64C 3/18 244/123.14 |
| 7,509,740 B2* | 3/2009 | Munk | B64F 5/0009 29/407.09 |
| 2003/0042364 A1* | 3/2003 | Tanaka | B64C 3/20 244/123.2 |
| 2005/0236524 A1 | 10/2005 | Sarb | |
| 2010/0000667 A1* | 1/2010 | Funnell | B29C 33/306 156/189 |

* cited by examiner

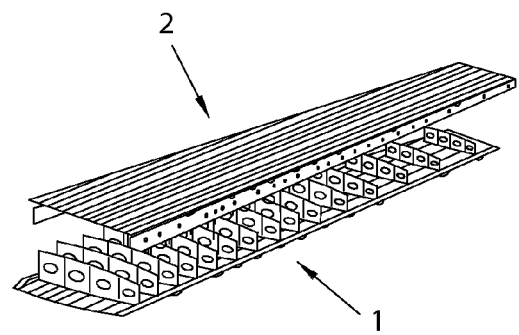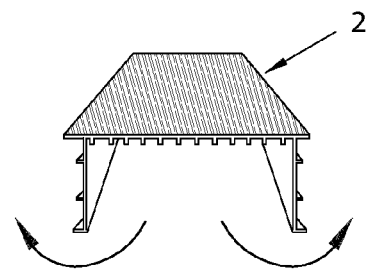
FIG. 7    FIG. 8
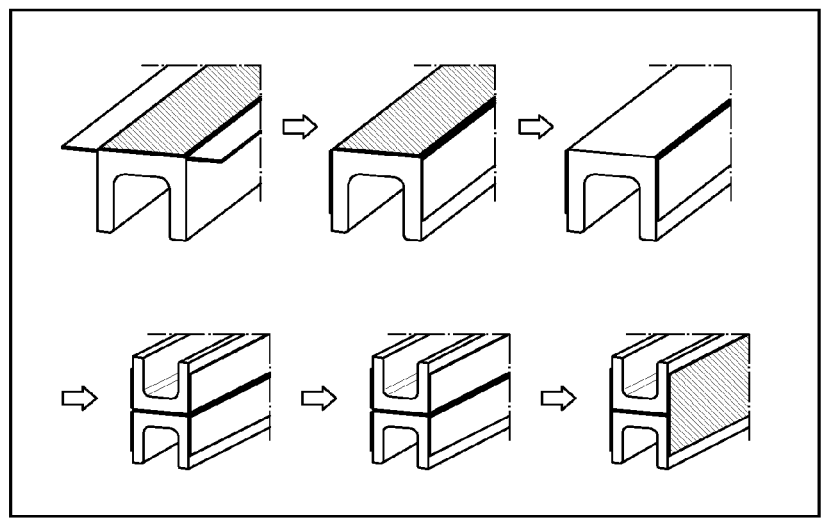
FIG. 9

HIGHLY INTEGRATED INFUSED BOX MADE OF COMPOSITE MATERIAL AND METHOD OF MANUFACTURING

REFERENCE TO RELATED APPLICATION

This claims priority to EP 13382581.0 filed Dec. 31, 2013, the entire contents of which is hereby incorporated by reference.

FIELD OF THE INVENTION

The present invention relates to a highly integrated infused box made of composite material, in particular to a torsion box which can be used in aircraft box structures, such as wings, vertical stabilizers (VTP), horizontal stabilizers (HTP), pylons and other control devices.

BACKGROUND OF THE INVENTION

At the moment structural integrity and high production rate are fundamental characteristics in the aeronautical industry, where competitiveness between airlines is very tough.

Structures with highly integrated boxes are considered to be an important step in the integration of composite structures in the aeronautical field.

Years ago aircraft were mostly or totally built up with metallic components, providing a good performance in terms of mechanical behaviour but, as a drawback, they were penalized in terms of weight.

As the aeronautical industry requires structures that, on the one hand, withstand the loads to which they are subjected, meeting high requirements on strength and stiffness, and on the other hand, are as light as possible, the use of composite materials in primary structures is more and more extended, because with appropriate application of said composite materials it is possible to achieve an important weight saving relative to a design in metallic material.

One of the most important solutions was the use of composite fibre reinforced polymers (CFRP) for major structural parts, achieving important weight savings and cost operation decrease.

In summary, it has been demonstrated that composite materials fulfil the following requirements:
Weight savings.
Cost effective.
Meet structural requisites under aircraft conditions.
Beneficial cost/weight relation.

A typical horizontal tail plane (HTP) architecture is divided into the following assemblies: leading edge, torsion box, trailing edge, tip, elevator and, in some cases, centre box.

Regarding the torsion box, some designs have been based mainly on a multi-rib structure with two spars (front spar and rear spar) and closed by two stiffened covers. In the case of Airbus A330 and A340, there can be a centre box instead of a centre joining rib as it can be found, for example, in A320. In this case, this structure is assembled and riveted because it has a skeleton with different stiffeners.

Although the first Airbus aircraft such as A300 and A310 were based on a metallic arrangement of ribs and spars, this design was soon replaced by CFRP components produced by different methods such as hand layup, ATL and RTM. The design corresponding to Airbus A350 XWB is based on this last approach, where spars, skins and ribs are monolithic CFRP parts produced by ATL.

The typical CFRP constructions currently used in the HTP torsion box are two-spar constructions comprising a front spar, a rear spar, stringers, skins and several transverse ribs between the front spar and the rear spar, the main function of said ribs being to provide torsional rigidity, to limit the skins and the stringers longitudinally so as to discretize the buckling loads and to maintain the shape of the aerodynamic surface. This structure is stiffened longitudinally by means of the stringers.

Typically, the process for manufacturing a torsion box is considerably manual and is carried out in a number of steps. The different parts (skin, stringers, spars and ribs) forming the box are manufactured separately and afterwards they are integrated by means of co-bonding (specially skins and stringers), and in most cases are mechanically joined with the aid of complicated jigs to achieve the necessary tolerances, which are given by the aerodynamic and structural requirements. This involves different assembly stations and a large amount of joining elements, such as rivets, which entails weight penalties, high production and assembly costs, greater necessary logistic capacity and worse aerodynamic quality in outer surfaces.

Besides that, some of the standard manufacturing processes for boxes imply a separated curing process for the ribs, the spars, the stringers and the skins.

For this reason, there have recently been great efforts to achieve an increasingly higher level of integration in the production of torsion boxes in composite material and thus prevent the aforementioned drawbacks.

For instance, WO 2008/132251 A1 relates to an integrated aircraft structure comprising a multispar torsion box made from composite material without ribs, with several I-shaped or T-shaped longitudinal stringers and spars, that intends to achieve an effective structure as regards strength/rigidity and low weight.

WO 2005/110842 A2, referred to an "Airfoil box and associated method", discloses an airfoil box that includes two or more half-shell structures that can be integrally formed of composite materials. Each half-shell structure is an integral or unitary member that includes at least a portion of the outer skin of the airfoil as well as stiffener members and connection members. The half-shell structures can be assembled by connecting the connection members with fasteners such as rivets to form the airfoil box.

Some of the prior art proposals try to obtain a high level of integration for the structures and try to avoid the separate manufacturing of the parts forming the box and the use the prepreg technology.

However, some of the current torsion boxes still comprise a high number of components and their manufacturing and assembly processes still involve a high number of operations. Besides that, the prepreg technology used in some of them is costly due to the curing process, which requires an autoclave.

SUMMARY OF THE INVENTION

The object of the invention is to provide a highly integrated infused box made of composite material with a simplified structure that can be manufactured according to a method that reduces the manufacturing and assembly operations.

The invention relates to a highly integrated infused box made of composite material with two skins, several ribs, several stringers, a front spar and a rear spar, comprising a first semibox and a second semibox joined by connecting means, in which:

the first semibox comprises one skin and all the ribs, and the second semibox comprises one skin, the front spar, the rear spar and the stringers.

The integrated infused box of the invention is manufactured using LRI (Liquid Resin Infusion) technology, and comprises two semiboxes, each one of them with reinforcing elements in one direction (the first semibox comprises the transverse reinforcing parts, while the second semibox comprises the longitudinal reinforcing parts), which simplifies the manufacturing of the box.

The invention also relates to an aircraft box structure, comprising the highly integrated infused box of the invention.

The invention also relates to a method of manufacturing a highly integrated infused box made of composite material that comprises the following steps:

Preparation of tool for infusion process and dry ATL of ribs, skins and stringers:
  Tool cleaning.
  Applying demoulding means to the tool.
Lay-up: the skins, stringers, spars and ribs are laminated with dry fibre with binder between the plies.
Forming process of spars, ribs and stringers: stringers are formed with a H form and are later cut into two T shapes, and spars and ribs are formed with a J shape.
Manufacturing process of the first semibox, comprising the following sub-steps:
  Placing the skin on the base tool.
  Placing the ribs over the skin.
  Placing rigid rib web tooling modules between the ribs, so that the face of each rib web that does not contain the upper flange of the rib is in contact with one of the sides of the tooling, and the whole is covered with a vacuum bag.
  Infusion of the first semibox with resin using LRI (Liquid Resin Infusion) technology.
  Curing with auto-heating tools or inside an oven.
  Demoulding: once the curing process has finished, the vacuum bag is removed and the tooling is demoulded.
  Ultrasonic and dimensional inspection.
Manufacturing process of the second semibox, comprising the following sub-steps:
  Placing the skin on the base tool.
  Placing the stringers and the spars over the skin.
  Placing stringer web flexible tooling modules with resin inlet on the stringers.
  Placing rigid spar web tooling modules between the spars, on the skin and on the stringer web flexible tooling modules.
  Infusion of the second semibox with resin using LRI (Liquid Resin Infusion) technology.
  Curing with auto-heating tools or inside an oven.
  Demoulding: once the curing process has finished, the vacuum bag is removed and the tooling is demoulded.
  Ultrasonic and dimensional inspection.
Assembly process of the first semibox with the second semibox by means of the drilling and riveting of the joints.

The main advantage over conventional manufacturing processes is based on the reduction of the manufacturing and assembly operations, because the number of components and the curing processes are reduced.

Some of the standard manufacturing processes for boxes imply a separated curing process for the ribs, the spars, the stringers and the skins. In contrast, the manufacturing method of the invention performs only two curing processes, one for the first semibox and another for the second semibox.

Another advantage of the invention is that no autoclave is needed for the curing. Composite structures built of prepregs, however, require an autoclave.

For the infusion process LRI technology is selected, due to the simplification of the tooling and its consequent non recurrent cost reduction compared to an RTM process.

The second semibox comprising one skin, the front and rear spars and the stringers, and not including ribs, has a certain flexibility (torque in span direction) able to open the spars a little bit during the integration between the two semiboxes. This very small torque makes possible this assembly with the shim and sealant application between ribs and spars avoiding the scatter of liquid during the integration process, and without involving a risky stress deformation to the structure.

The assembly process is significantly shortened as the number of necessary stages and operations is reduced considerably because the most time consuming phases of the lateral boxes assembly operations are avoided.

The required quantity of rivets is reduced as major quantities of joints are co-infused; this also reduces weight due to the elimination of these mechanical bonds.

Other characteristics and advantages of the present invention will become more clear from the following detailed description of a typical embodiment of its object, referring to the accompanying drawings.

DESCRIPTION OF THE DRAWINGS

FIG. 7 shows the first semibox and the second semibox of a highly integrated infused box made of composite material before being joined together.

FIG. 8 shows the flexibility of the second semibox.

FIG. 9 shows the forming process of the stringers of the highly integrated infused box made of composite material according to the invention.

DETAILED DESCRIPTION OF THE INVENTION

Figure 1:
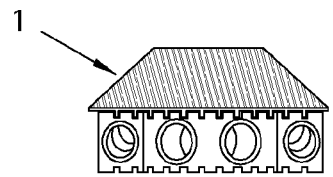
FIGS. 1, 3 and 5 show different views of a first semibox of a highly integrated infused box made of composite material according to the invention.
Figure 3:
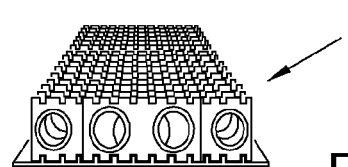
Figure 5:
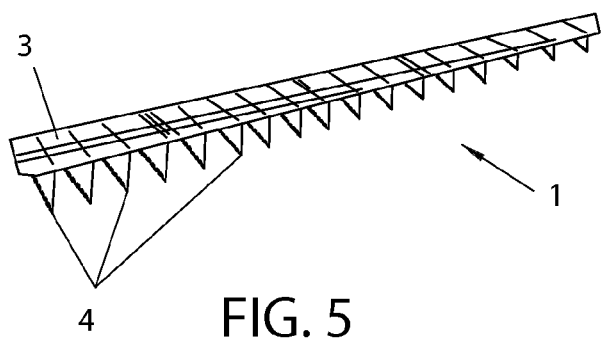

FIGS. 1, 3 and 5 show several views of the first semibox 1 of the highly integrated infused box made of composite material according to the invention. The first semibox 1 comprises one skin 3 and the ribs 4.

Figure 4:
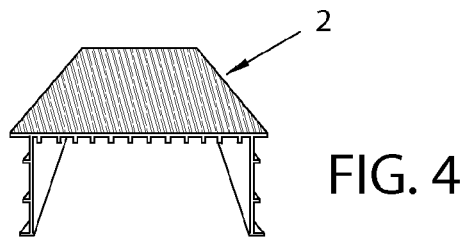
FIGS. 2, 4 and 6 show different views of a second semibox of a highly integrated infused box made of composite material according to the invention.
Figure 2:
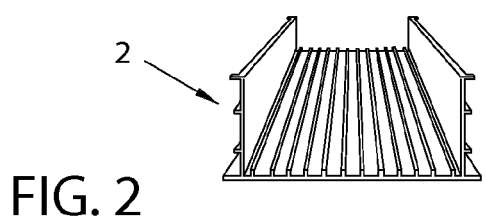
Figure 6:
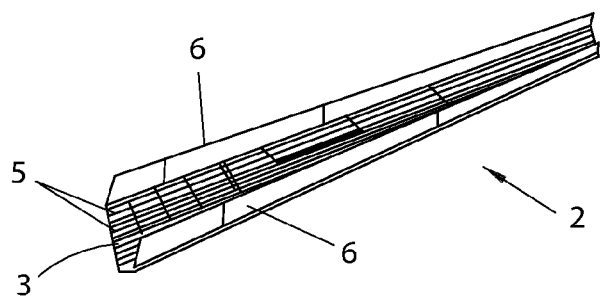

FIGS. 2, 4 and 6 show several views of the second semibox 2 of the highly integrated infused box made of composite material according to the invention. The second semibox 2 comprises a skin 3, the front spar, the rear spar and the stringers 5.

Both semiboxes 1, 2 use dry fibre (foil weave or unidirectional weave).

As shown in FIG. 7, both semiboxes 1,2 are complementary, and after being assembled together, they form the highly integrated infused box made of composite material according to the invention.

FIG. 8 shows the flexibility of the second semibox 2. As the ribs 4 are not included in this semibox 2, it has a certain flexibility that makes it possible for the spars 6 to open a little bit during the integration with the first semibox 1, to which it is joined by connecting means In an embodiment of the invention, the ribs 4 and the spars 6 are J-shaped (as it can be seen in FIG. 10) and the stringers 5 are T-shaped (see FIG. 9).

The stringers 5 are formed by joining two C shaped preforms, which together form a double C (or H form), which will later be cut into two T-shaped stringers 5 (FIG. 9).

As for the ribs 4 and spars 6, they are formed using a forming process that comprises two steps:
Forming two L shapes, using side modules, each one of them divided into two sub-modules (an upper one and a lower one) which are kept together at this stage.
Joining both L shapes, removing the lower sub-modules and bending the web 15 to change the T shape into a J shape.
Introduction of rovings (unidirectional fiber strips which must be of the same material as that used in the lay-ups or a compatible material) in the gap between the bases of the L shapes.

Figure 10:
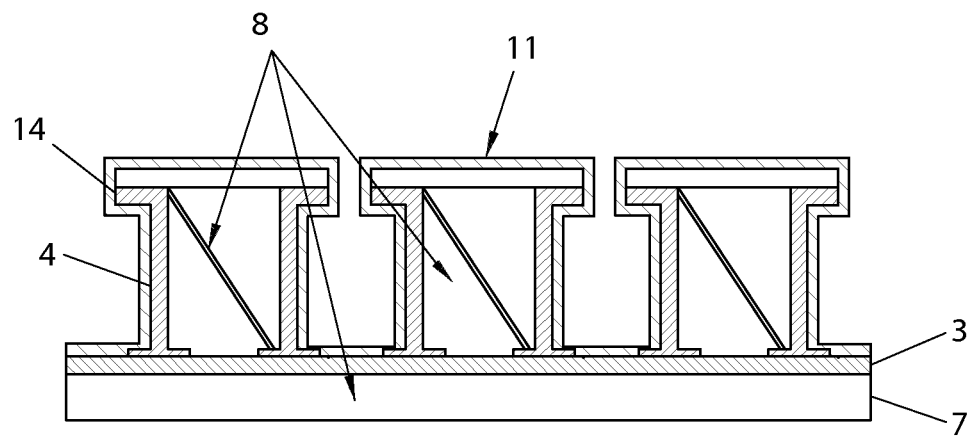
FIG. 10 shows the tooling and the vacuum bag used in the manufacturing process of the first semibox.
Figure 11:
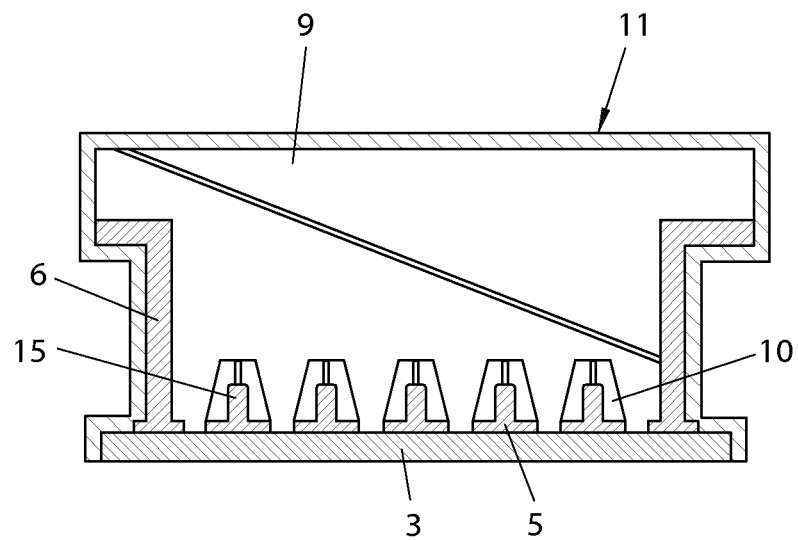
FIG. 11 shows tooling and the vacuum bag used in the manufacturing process of the second semibox.

It is important that the ribs 4, spars 6 and stringers 5 are provided with feet 16 on either side of the web 15 (see FIGS. 10 and 11). The J-shape of the ribs 4 and spars 6 and the T-shape of the stringers 5 allow such configuration.

Rovings are also introduced in the gap existing between the stringers 5 and the skin 3.

The feet 16 on either side of the web 15 allow the following advantages:
The joining surface between the reinforcement element and the skin 3 is increased.
To avoid gaps/corners on the side of the web 15 that is not provided with a foot 16 in the area in contact with the skin 3, which could cause peeling effects.

Figure 12:
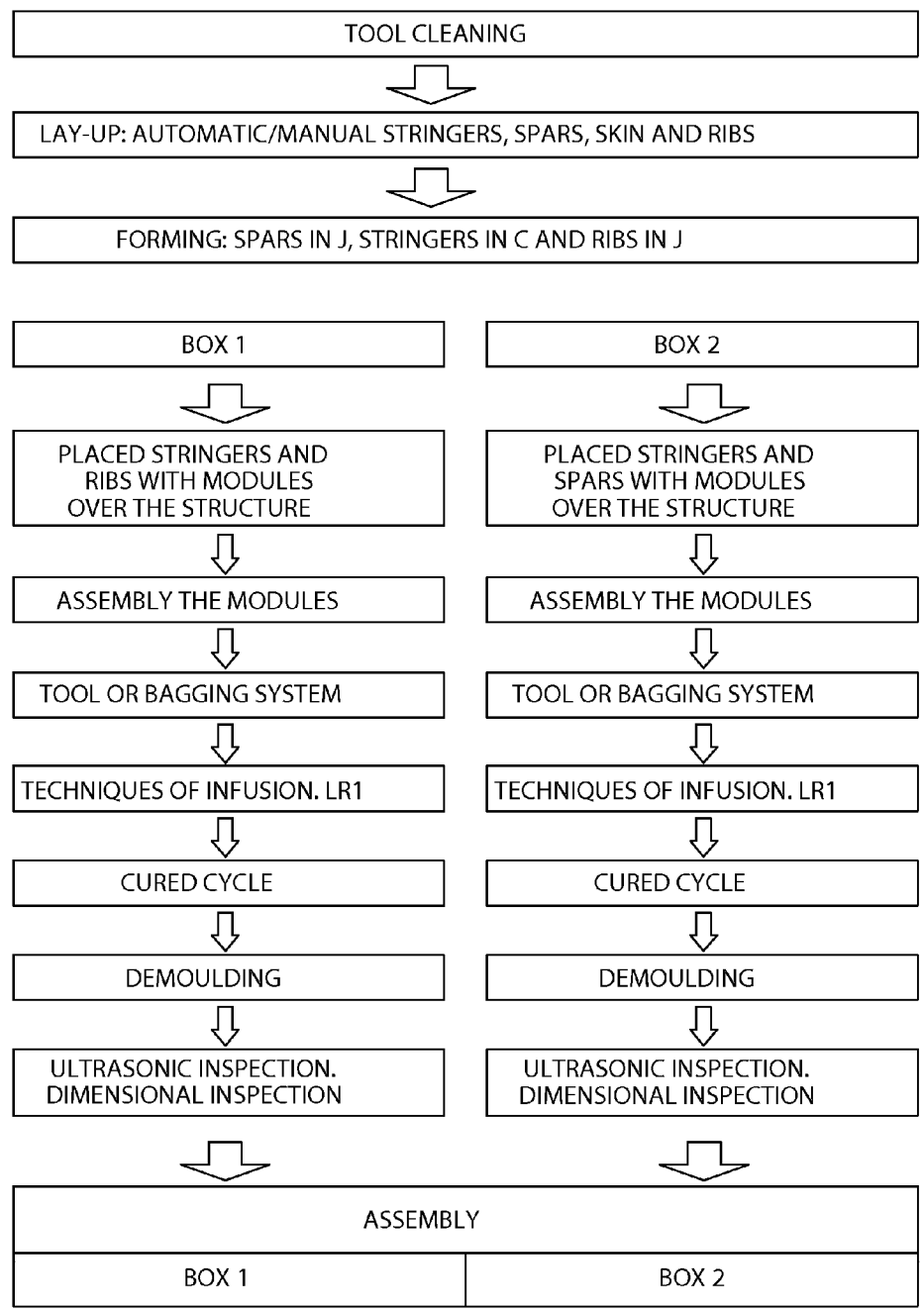
FIG. 12 shows a schematic sequence of the manufacturing process of a highly integrated infused box made of composite material according to the invention.

FIG. 12 shows a schematic flow chart with the sequence of steps of the manufacturing process of a highly integrated infused box made of composite material according to the invention.

The method of manufacturing a highly integrated infused box made of composite material according to the invention comprises the following steps:
Preparation of tool for injection process and dry ATL of ribs 4, skins 3 and stringers 5:
Tool cleaning.
Applying demoulding means to the tool (this will allow an easy demoulding)
Lay-up: the skins 3, stringers 5, spars 6 and ribs 4 are laminated with dry fibre with binder between the plies. Thanks to the binder between the plies, the automatic lay-up process could be performed similarly to what is done with prepreg technology depending on the material used.
Forming process of spars 6, ribs 4 and stringers 5:
stringers 5 are formed with a H form and are later cut into two T shapes (see FIG. 9), and spars 6 and ribs 4 are formed with a J shape. Similar hotforming process can be applied for dry fibre thanks to the binder between the dry laminates which provides the capability to slide the plies in the forming process.
Manufacturing process of the first semibox 1, comprising the following sub-steps:
Placing the skin 3 on the base tool 7.
Placing the ribs 4 over the skin 3.
Placing rigid rib web tooling modules 8 between the ribs 4, so that the face of each rib web that does not contain the upper flange 14 of the rib 4 is in contact with one of the sides of the tooling 8, and the whole is covered with a vacuum bag 11.
Infusion of the first semibox 1 with resin using LRI (Liquid Resin Infusion) technology.
Curing with auto-heating tools or inside an oven.
Demoulding: once the curing process has finished, the vacuum bag 11 is removed and the tooling 7, 8 is demoulded.
Ultrasonic and dimensional inspection.
Manufacturing process of the second semibox 2, comprising the following sub-steps:
Placing the skin 3 on the base tool.
Placing the stringers 5 and the spars 6 over the skin 3.
Placing stringer web flexible tooling modules 10 with resin inlet 12 on the stringers 5.
Placing rigid spar web tooling modules between the spars (6), on the skin 3 and on the stringer web flexible tooling modules 10.
Infusion of the second semibox 2 with resin using LRI (Liquid Resin Infusion) technology.
Curing with auto-heating tools or inside an oven.
Demoulding: once the curing process has finished, the vacuum bag 11 is removed and the tooling 9, 10 is demoulded.
Ultrasonic and dimensional inspection.
Assembly process of the first semibox 1 with the second semibox 2 by means of the drilling and riveting of the joints.

Figure 13:
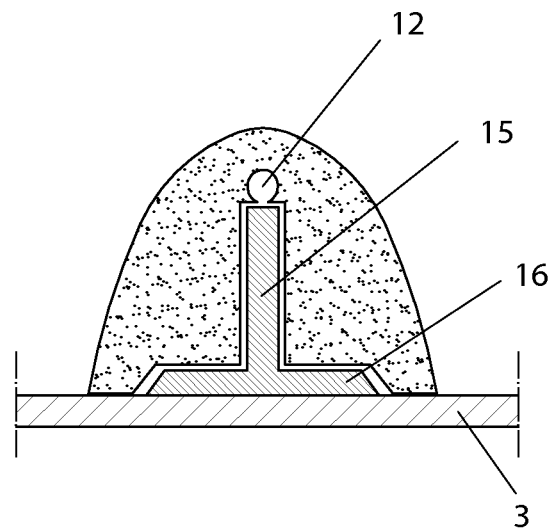
FIG. 13 shows a stringer web flexible tooling module with a resin inlet for the infusion process.

In FIG. 11 it can be seen that there is a tooling module 9 placed on the sections of the skin 3 between the stringers 5 and on the upper flanges of the spars 6, and that there are smaller tooling modules 10 that surround the web 15 of each stringer 5. The smaller tooling modules 10 allow the compacting of the part and its demoulding. FIG. 13 shows the soft tooling for stringer supporting and resin inlet tooling. For stringers 5, soft supporting tooling is used to take advantage of their lightness, handling and versatility. A silicone profile is traditionally used for resin distribution for the infusion process, with a resin inlet 12 over the head of the stringer 5.

Figure 14:
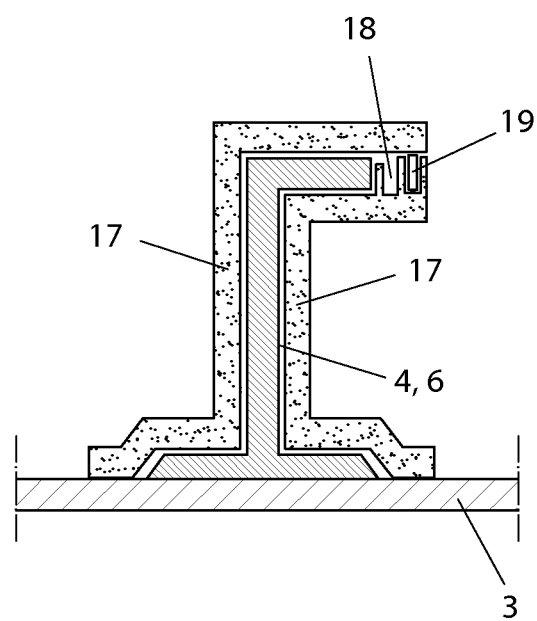
FIG. 14 shows the ribs and spars supporting tooling with a resin inlet.

FIG. 14 shows the hard tooling 17 for ribs 4 and spars 6. This hard supporting tooling 17 is needed to assure a good compaction and to reduce porosity. They also include a resin inlet channel 18 and edge closure sealant device 19.

Tooling edge on the mouse hole area of the ribs 4 only contains a sealant device (sealing gasket), but not a resin channel to minimize distances between rib 4 and stringer 5 in these zones.

According to an embodiment, the drilling and riveting of the joints in the assembly process of the first semibox 1 with the second semibox 2 is performed from the outer surface using blind bolts.

Standard hi-lite titanium bolts can be used for the spars 6 as hand holes in the spars 6 are compatible with this concept to introduce these bolts. Blind fasteners are used for the union of the ribs 4 with the skin 3, and standard hi-lite titanium bolts for the union of the spars 6 to the skin 3, and for the union of the spars 6 to the ribs 4.

The lay-up in the manufacturing process may be automatic or manual, depending the material.

In the embodiments that have just been described, it is possible to introduce the modifications within the scope defined by the following claims.

The invention claimed is:

1. A highly integrated infused box made of composite material with first and second skins, several ribs, several stringers, a front spar and a rear spar, comprising a first semibox and a second semibox joined by connecting means, wherein:
    the first semibox comprises the first skin and all of the ribs, and
    the second semibox comprises the second skin, the front spar, the rear spar and the stringers.

2. The highly integrated infused box made of composite material according to claim 1, wherein the ribs and the front and rear spars are J-shaped and the stringers are T-shaped.

3. An aircraft box structure comprising the highly integrated infused box according to claim 1.

4. The aircraft box structure according to claim 3, wherein the aircraft box structure is one of a wing, a vertical stabilizer (VTP), a horizontal stabilizer (HTP) and a pylon.

5. A method of manufacturing the highly integrated infused box of claim 1, the method comprising:
    preparing a base tool for an injection process and a dry automated tape laying-up (ATL) of the ribs, the first skin, the second skin and the stringers, wherein preparing the base tool comprises cleaning the base tool and applying a demoulding agent to the base tool;
    laying-up the first and second skins, the stringers, the front and rear spars and the ribs by laminating the first and second skins, the stringers, the front and rear spars and the ribs with dry fibre and providing a binder between the plies;
    forming the stringers into an H form and then cutting the H form into two T shapes;
    forming the front and rear spars and ribs into a J shape;
    manufacturing the first semibox, the manufacturing of the first semibox comprising:
        placing the first skin on the base tool;
        placing the ribs over the first skin;
        placing rigid rib web tooling modules between the ribs so that the face of each rib that does not contain an upper flange of the rib is in contact with one of the sides of the rigid rib web tooling modules;
        covering the first skin, the ribs and the rigid rib web tooling modules with a vacuum bag;
        infusing the first semibox with resin using Liquid Resin Infusion (LRI) technology;
        curing the resin with auto-heating tools or inside an oven;
        performing a demoulding step once the curing has finished, the demoulding step including removing the vacuum bag and demoulding the rigid rib web tooling modules; and
        inspecting the first semibox ultrasonically and dimensionally;
    manufacturing the second semibox, the manufacturing of the second semibox comprising:
        placing the second skin on the base tool;
        placing the stringers and the front and rear spars over the second skin;
        placing flexible stringer web tooling modules with resin inlets on the stringers;
        placing rigid spar web tooling modules between the spars;
        covering the second skin, the rigid spar web tooling modules and the flexible stringer web tooling modules;
        infusing the second semibox with resin using LRI technology;
        curing the resin with the auto-heating tools or inside the oven;
        performing a demoulding step once the curing has finished, the demoulding step including removing the vacuum bag and demoulding the flexible stringer web tooling modules and the rigid spar web tooling modules;
    inspecting the first semibox ultrasonically and dimensionally; and
    assembling the first semibox to the second semibox by drilling and riveting joints between the first and second semiboxes.

6. The method according to claim 5, wherein the drilling and riveting of the joints in the assembly of the first semibox to the second semibox is performed from an outer surface of the assembly using blind bolts.

7. The method according to claim 6, wherein hi-lite titanium bolts are used for the front and rear spars.

8. The method according to claim 5, wherein the laying-up step is performed manually.

9. The method according to claim 5, wherein the laying-up step is performed automatically.

10. An aircraft box made of composite material, the aircraft box extending in a transverse direction and a longitudinal direction and comprising:
    a plurality of transverse reinforcing parts, each of the plurality of transverse reinforcing parts having a length that extends in the transverse direction;
    a plurality of longitudinal reinforcing parts, each of the plurality of longitudinal reinforcing parts having a length that extends in the longitudinal direction;
    a first semibox comprising a first skin portion and the plurality of transverse reinforcing parts, wherein all of the transverse reinforcing parts of the aircraft box are bonded to the first skin portion; and
    a second semibox assembled to the first semibox and comprising a second skin portion bonded to the plurality of longitudinal reinforcing parts.

11. The aircraft box of claim 10, wherein all of the longitudinal reinforcing parts are bonded to the second skin portion.

12. The aircraft box of claim 10, wherein the assembled first and second semiboxes form an infused box that forms part of an aircraft wing, a vertical stabilizer, a horizontal stabilizer or a pylon.

13. The aircraft box of claim 10, wherein the plurality of transverse reinforcing parts comprises ribs, and the plurality of longitudinal reinforcing parts comprises stringers and spars.

14. The aircraft box of claim 13, wherein the ribs and the spars are J-shaped and the stringers are T-shaped.

15. A method of manufacturing the aircraft box of claim 10 comprising:
    cleaning and applying a demoulding agent to a base tool;
    laminating the first skin portion with dry fibre and providing a binder between plies;
    laminating the second skin portion with dry fibre and providing a binder between plies;
    laminating the transverse reinforcing parts with dry fibre and providing a binder between plies;

laminating the longitudinal reinforcing parts with dry fibre and providing a binder between plies;

forming some of the longitudinal reinforcing parts into an H form and then cutting the H form into two T shapes;

forming the transverse reinforcing parts and the remaining longitudinal reinforcing parts into a J shape;

manufacturing the first semibox;

manufacturing the second semibox; and assembling the first semibox to the second semibox by drilling and riveting joints between the first and second semiboxes.

16. The method according to claim 15, wherein the drilling and riveting of the joints is performed from the outer surface of the aircraft box using blind bolts.

17. The method of claim 15, wherein manufacturing the first semibox comprises:

placing the first skin portion on the base tool;

placing the transverse reinforcing parts over the first skin portion;

placing first rigid web tooling modules between the transverse reinforcing parts so that a face of each transverse reinforcing part that does not contain an upper flange of the respective transverse reinforcing part is in contact with one of the sides of a corresponding first rigid web tooling module;

covering the first skin portion, the transverse reinforcing parts and the first rigid web tooling modules with a vacuum bag;

infusing the first semibox with resin using (LRI) technology;

curing the resin with auto-heating tools or inside an oven;

removing the vacuum bag;

demoulding the first rigid web tooling modules; and inspecting the first semibox ultrasonically and dimensionally.

18. The method of claim 17, wherein manufacturing the second semibox comprises:

placing the second skin portion on the base tool;

placing the longitudinal reinforcing parts over the second skin portion;

placing flexible web tooling modules with resin inlets on some of the longitudinal reinforcing parts;

placing second rigid web tooling modules between the remaining longitudinal reinforcing parts;

covering the second skin portion, the transverse reinforcing parts, the flexible web tooling modules and the second rigid web tooling modules with a vacuum bag;

infusing the second semibox with resin using LRI technology;

curing the resin with the auto-heating tools or inside the oven;

removing the vacuum bag;

demoulding the flexible web tooling modules and the second rigid web tooling modules; and inspecting the first semibox ultrasonically and dimensionally.

19. A method of manufacturing an aircraft box made of composite material, the method comprising:

preparing a base tool for an injection process and a dry automated tape laying-up (ATL) of ribs, a first skin, a second skin and stringers, wherein preparing the base tool comprises cleaning the base tool and applying a demoulding agent to the base tool;

laying-up the first and second skins, the stringers, front and rear spars and the ribs by laminating the first and second skins, the stringers, the front and rear spars and the ribs with dry fibre and providing a binder between the plies;

forming the stringers into an H form and then cutting the H form into two T shapes;

forming the front and rear spars and ribs into a J shape;

manufacturing a first semibox, the manufacturing of the first semibox comprising:

placing the first skin on the base tool;

placing the ribs over the first skin;

placing rigid rib web tooling modules between the ribs so that the face of each rib that does not contain an upper flange of the rib is in contact with one of the sides of the rigid rib web tooling modules;

covering the first skin, the ribs and the rigid rib web tooling modules with a vacuum bag;

infusing the first semibox with resin using Liquid Resin Infusion (LRI) technology;

curing the resin with auto-heating tools or inside an oven;

performing a demoulding step once the curing has finished, the demoulding step including removing the vacuum bag and demoulding the rigid rib web tooling modules; and inspecting the first semibox ultrasonically and dimensionally;

manufacturing a second semibox, the manufacturing of the second semibox comprising:

placing the second skin on the base tool;

placing the stringers and the front and rear spars over the second skin;

placing flexible stringer web tooling modules with resin inlets on the stringers;

placing rigid spar web tooling modules between the spars;

covering the second skin, the rigid spar web tooling modules and the flexible stringer web tooling modules;

infusing the second semibox with resin using LRI technology;

curing the resin with the auto-heating tools or inside the oven;

performing a demoulding step once the curing has finished, the demoulding step including removing the vacuum bag and demoulding the flexible stringer web tooling modules and the rigid spar web tooling modules;

inspecting the first semibox ultrasonically and dimensionally; and assembling the first semibox to the second semibox by drilling and riveting joints between the first and second semiboxes.

* * * * *